(12) United States Patent
Yuh et al.

(10) Patent No.: US 8,088,697 B2
(45) Date of Patent: Jan. 3, 2012

(54) FIBROUS CERAMIC MATERIAL AND METHOD FOR MAKING THE SAME

(75) Inventors: Chao-Yi Yuh, New Milford, CT (US); Dana A. Kelley, New Milford, CT (US); Nikhil H. Jalani, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 580 days.

(21) Appl. No.: 12/233,427

(22) Filed: Sep. 18, 2008

(65) Prior Publication Data

US 2010/0068601 A1    Mar. 18, 2010

(51) Int. Cl.
*D04H 1/00* (2006.01)
*D04H 13/00* (2006.01)
*D04H 3/00* (2006.01)

(52) U.S. Cl. ............... 442/340; 428/312.8; 428/311.51; 428/222; 442/391; 442/414; 156/89.12; 501/95.2

(58) Field of Classification Search ............... 442/340, 442/391, 414; 428/312.8, 311.51, 222; 429/34, 429/35
See application file for complete search history.

(56) References Cited

U.S. PATENT DOCUMENTS

| | | | |
|---|---|---|---|
| 4,467,018 A | 8/1984 | Schroll | |
| 5,110,675 A * | 5/1992 | Newkirk | ............ 428/312.2 |
| 5,110,692 A | 5/1992 | Farooque et al. | |
| 5,380,580 A * | 1/1995 | Rogers et al. | ............ 428/219 |
| 5,478,663 A | 12/1995 | Cipollini et al. | |
| 6,964,825 B2 | 11/2005 | Farooque et al. | |
| 7,294,427 B2 | 11/2007 | Kelley et al. | |
| 2001/0038909 A1 | 11/2001 | Mercuri et al. | |
| 2006/0141306 A1 | 6/2006 | Kelley et al. | |
| 2006/0154128 A1 * | 7/2006 | Kim et al. | ............ 429/30 |
| 2008/0053051 A1 | 3/2008 | Aoki et al. | |
| 2009/0258206 A1 | 10/2009 | Chida et al. | |

FOREIGN PATENT DOCUMENTS

| | | |
|---|---|---|
| KR | 10-2006-0082327 | 7/2006 |
| KR | 10-2008-0060233 | 7/2008 |

OTHER PUBLICATIONS

B. H. Hamling, et al., "Ceramic Cloth Combats Corrosion", Advanced Materials & Process Magazine, Jun. 1986.
International Search Report and Written Opinion of the International Searching Authority issued on Apr. 28, 2010 in counterpart PCT Application No. PCT/US2009/056888 and citing Documents 1-2 of the US Publications and Documents 1-2 of Foreign Patent Documents.

* cited by examiner

*Primary Examiner* — Norca L Torres Velazquez
(74) *Attorney, Agent, or Firm* — Cowan, Liebowitz & Latman, P.C.

(57) ABSTRACT

A fibrous ceramic material including a plurality of fibers entangled with one another. The fibrous ceramic material includes at least one connector projecting between the fibers. At least a portion of the fibers have the connectors extending between and attach the fibers to one another. A method of manufacturing the fibrous ceramic material includes providing a precursor material having a plurality of fibers. A holder is provided for holding the precursor material. The precursor material is placed on the holder and both are heated to between about 1500 degrees Celsius and about 1700 degrees Celsius to form the fibrous ceramic material, thereby causing connectors to project from a portion of the fibers and attach the fibers to one another.

30 Claims, 16 Drawing Sheets

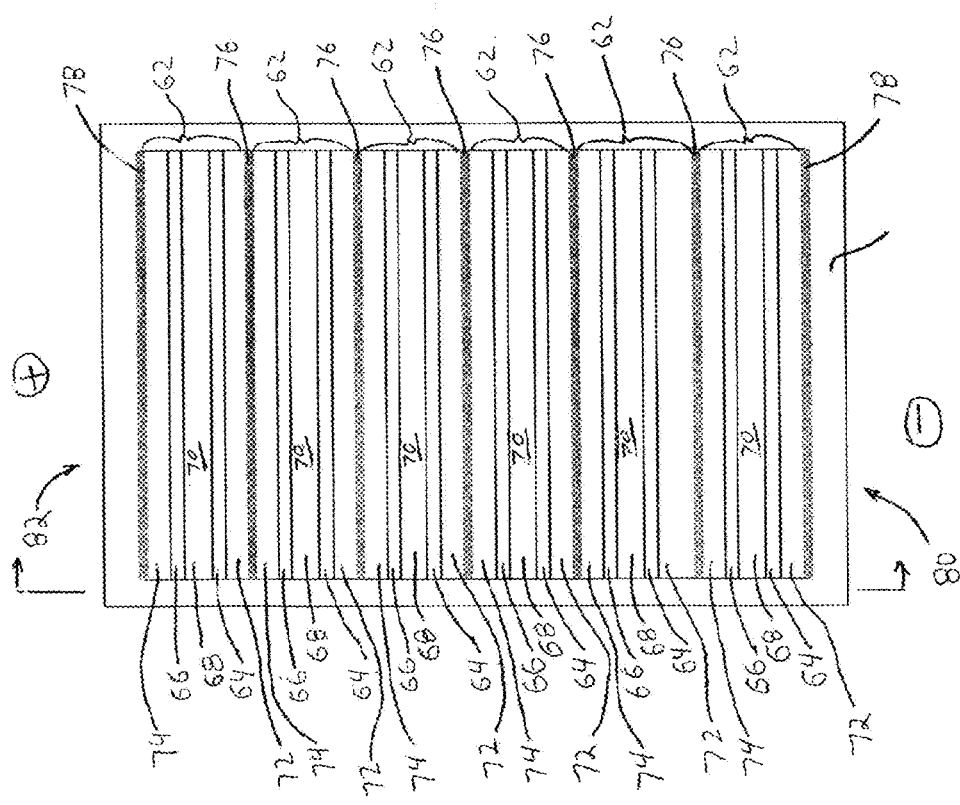

US 8,088,697 B2

FIBROUS CERAMIC MATERIAL AND METHOD FOR MAKING THE SAME

FIELD OF THE INVENTION

The present invention is generally directed to a fibrous ceramic material and is more specifically directed to a sag resistant fibrous ceramic material having a generally high compressive strength.

BACKGROUND OF THE INVENTION

Ceramic materials such as sheets and fabrics comprised of ceria ($CeO_2$), zirconia ($ZrO_2$) and alumina ($Al_2O_3$) have been used in high temperature sealing and refractory applications. In particular, such ceramic materials have been used to manufacture conventional gaskets for wet and/or dry sealing of various high temperature fluids. However, such conventional gaskets are pliable and tend to sag when handled or otherwise manipulated during an assembly process. In addition, conventional gaskets have relatively low compressive strength. For example, conventional gaskets can irreversibly crush and achieve a strain of almost 0.9 in/in, when subject to a relatively low compressive load, thereby degrading the gaskets' sealing performance.

Gaskets made from ceramic materials have also been used in various fuel cell applications. Conventional fuel cells typically include an anode and a cathode separated by an electrolyte contained in an electrolyte matrix. The anode, the cathode, the electrolyte and the electrolyte matrix are disposed between a first collector and a second collector, with the first collector adjacent to the anode and the second collector adjacent to the cathode. Fuel flows to the anode via the first collector and an oxidant flows to the cathode via the second collector. The fuel cell oxidizes the fuel in an electrochemical reaction which releases a flow of electrons between the anode and cathode, thereby converting chemical energy into electrical energy.

The fuel cells described above can be stacked in series with separator plates disposed between adjacent fuel cells and end plates disposed on opposing ends of the fuel cell stack. Fuel cells are stacked to increase the electrical energy they produce. Fuel cell stacks have a negative side with a negative end cell and a positive side with a positive end cell.

One particularly useful fuel cell stack is a Molten Carbonate Fuel Cell (MCFC) stack which generally has an operating temperature of approximately 650 degrees Celsius. A problem sometimes experienced by liquid phase fuel cells such as MCFCs is electrolyte migration which is characterized by the loss of the electrolyte from one end cell and the gain of electrolyte by the other end cell. Electrolyte migration is caused by an electric voltage gradient along the length of the stack and generated by the cells in the MCFC stack. Loss of the electrolyte from the positive end cells can cause gas pockets in the electrolyte matrix of the positive end cell. This results in an irreversible increase in internal electrical resistance causing a significant voltage drop across the positive end cell and therefore decreasing the useful life of the MCFC stack. Migration of the electrolyte towards the negative end cell can also cause the negative end cell to become flooded with electrolyte, thereby reducing MCFC stack performance and life.

Electrolyte migration can occur because the electrolyte is a molten liquid when the MCFC is at its operating temperature. Thus during operation, when the electrolyte is liquid, the electrolyte can flow along an outer surface of the MCFC stack. In particular, the electrolyte can flow in and/or under a gasket disposed between the outer surface and a manifold used to channel fluid such as fuel and air to the fuel cell. Problems with conventional ceramic gaskets (e.g., felts of zirconia, alumina and ceria) used for liquid phase fuel cells include: absorbing high amounts of electrolyte, acting as a conduit for electrolyte movement and having low strength. The low strength of these materials makes them difficult to handle and install in fuel cells. Ceramic gaskets such as those consisting of ZYF100 zirconia felt manufactured and as received from by Zircar Zirconia, Inc. of Florida, N.Y. have been used as a material for MCFC gaskets. However, such gaskets typically can cause performance problems associated with electrolyte migration and have poor mechanical properties (e.g., low compressive strength and significant sag).

Attempts have been made to improve the mechanical properties of ceramic fabric through heat treatment, but only limited success has been achieved. For example, heat treatment of ceramic fabric on refractory brick causes the ceramic fabric to react with and/or be absorbed by the refractory brick. In addition, attempts to heat treat ceramic fabric on alumina blocks having a 96 percent by weight purity resulted in the ceramic fabric sticking to the alumina block.

Attempts have also been made to identify ceramic gasket materials with reduced electrolyte absorption to reduce electrolyte migration in MCFCs. However, the conventional zirconia and alumina gasket materials have high electrolyte absorption and undesirable migration rates. Furthermore, alumina is shown to be unstable and reacts with molten alkali carbonate electrolyte to form $LiAlO_2$.

SUMMARY OF THE INVENTION

According to one aspect of the present invention, a fibrous ceramic material is used for high temperature sealing and/or refractory applications. For example, this particular fibrous ceramic material finds utility as a gasket in Molten Carbonate Fuel Cells (MCFCs). The fibrous ceramic material comprises a plurality of entangled fibers, a portion of which are joined by connectors formed as a result of heat treating a precursor material. The grain size of the fibers is at least 5 μm (micrometers) to form a generally smooth outer surface thereby reducing wettability and liquid absorption compared to a finer-grain structure, with a rougher fiber surface having a high wettability and high liquid absorption. In MCFC applications, the smooth outer surface of the fiber reduces electrolyte wettability and electrolyte absorption.

In another aspect of the present invention, one or more of the fibers is formed of a plurality of segments longitudinally connected to one another in an end-to-end configuration.

In a preferred embodiment of the present invention, after heat treatment, the fibrous ceramic material is semi-rigid and sag resistant. Preferably the fibrous ceramic material displays one or more of the following mechanical properties: 1) a substantially self sustaining structure or shape with little or no sag; 2) a strain of less than about 0.1 inches per inch at a compressive load of about 30 pound per square inch; 3) an electrolyte pickup (i.e., the percent by volume of molten electrolyte which can be absorbed by a material) of less than about 70 percent of the electrolyte pickup of zirconia felt; 4) an electrolyte migration rate of about 30 to about 40 percent as compared to the electrolyte migration of zirconia felt; and 5) a compliance (i.e., the difference between a strain with a compressive load applied and the strain after the compressive load is reduced to zero) of up to about 0.11 inches per inch, after an applied load of up to about 200 psi is reduced to zero.

In still another aspect of the present invention, a fibrous ceramic laminate is used for high temperature sealing and/or refractory applications. For example, this particular fibrous ceramic laminate finds utility in MCFC gasket applications and includes a plurality of layers of the fibrous ceramic material attached to one another by a heat treatment process. Each of the layers includes a plurality of entangled fibers attached together by a plurality of connectors formed as a result of the heat treatment process.

Another aspect of the present invention resides in a method of manufacturing a fibrous ceramic material that includes providing a precursor material having a plurality of entangled fibers. In addition, a holder is provided for receiving the precursor material during manufacturing. Preferably, the holder is made of alumina having a purity greater than 96 percent by weight. The precursor material is placed on the holder and both are heated to between 1500 degrees Celsius and 1700 degrees Celsius to form the fibrous ceramic material. Heating the precursor material to between about 1500 degrees Celsius and about 1700 degrees Celsius causes connectors to form. The connectors project between and attach themselves to fibers and/or other connectors.

The present invention also resides in a method of manufacturing a fibrous ceramic laminate whereby a plurality of precursor layers having a plurality of entangled fibers are stacked between a first and second holder. Preferably, the first and second holders are made of alumina having a purity greater than 96 percent by weight. Moreover, it is preferable that the precursor layers are made from a ceria felt having a plurality of entangled fibers. The precursor layers are heated along with the first and second holders to between about 1500 degrees Celsius and about 1700 degrees Celsius causing connectors to project from the fibers and attach the fibers to one another. Heating the precursor layers causes the formation of the fibrous ceramic material, and also causes the layers to attach to one another thereby forming the fibrous ceramic laminate.

In an embodiment of the above described method, the precursor layers are compressed to a predetermined thickness after they are stacked between the first and second holders, the holders being separated by one or more stops.

DESCRIPTION OF THE DRAWINGS

FIG. 17 is a schematic view of a fuel cell stack including a gasket made of the fibrous ceramic material.

FIG. 18 is a cross sectional side view of the fuel cell stack of FIG. 17 with a manifold secured thereto.

DETAILED DESCRIPTION OF THE PREFERRED EMBODIMENTS

Figure 1:
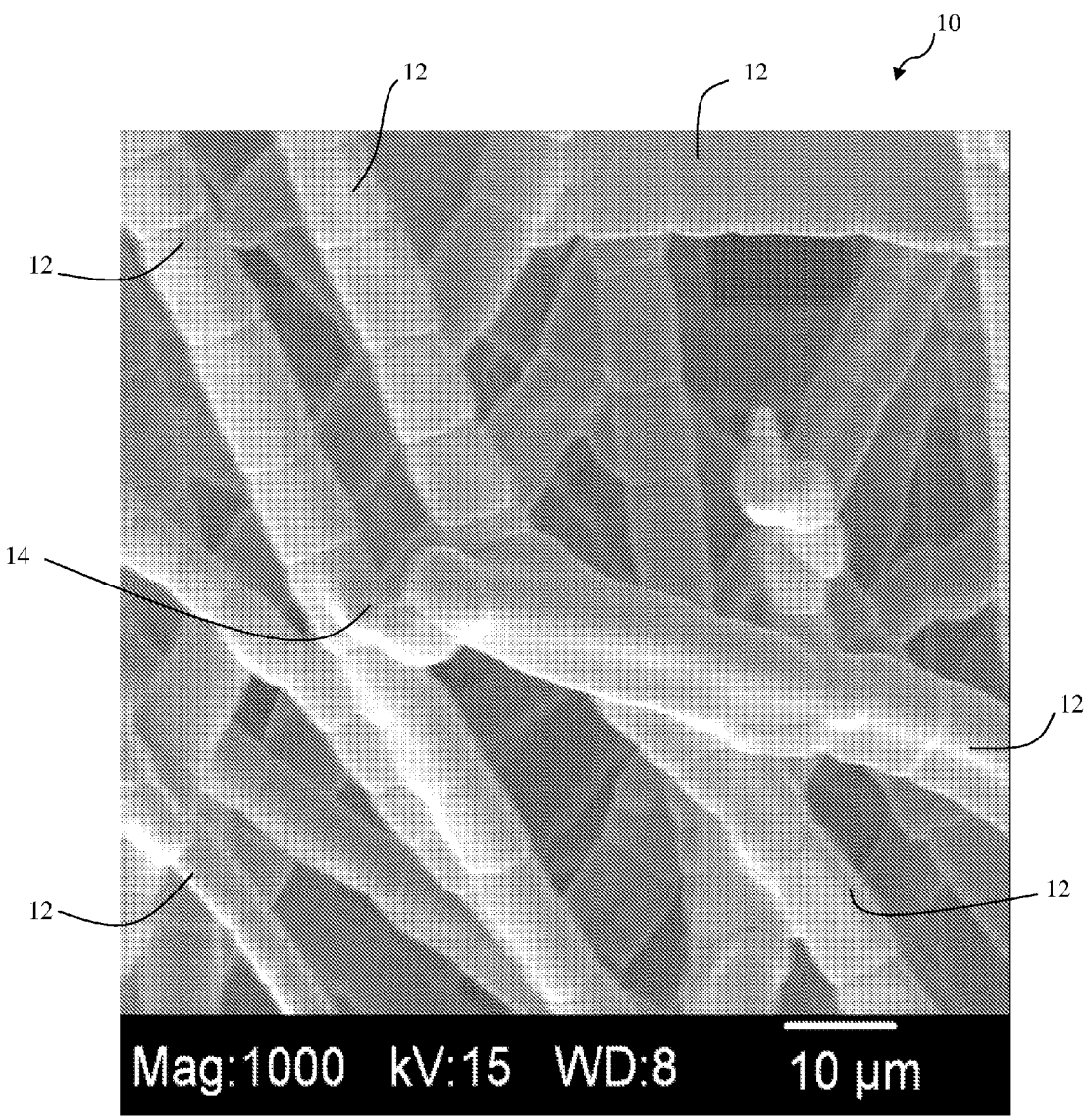
FIG. 1 is a Scanning Electron Microscope (SEM) photomicrograph of a portion of a fibrous ceramic material in accordance with the present invention.
Figure 2:
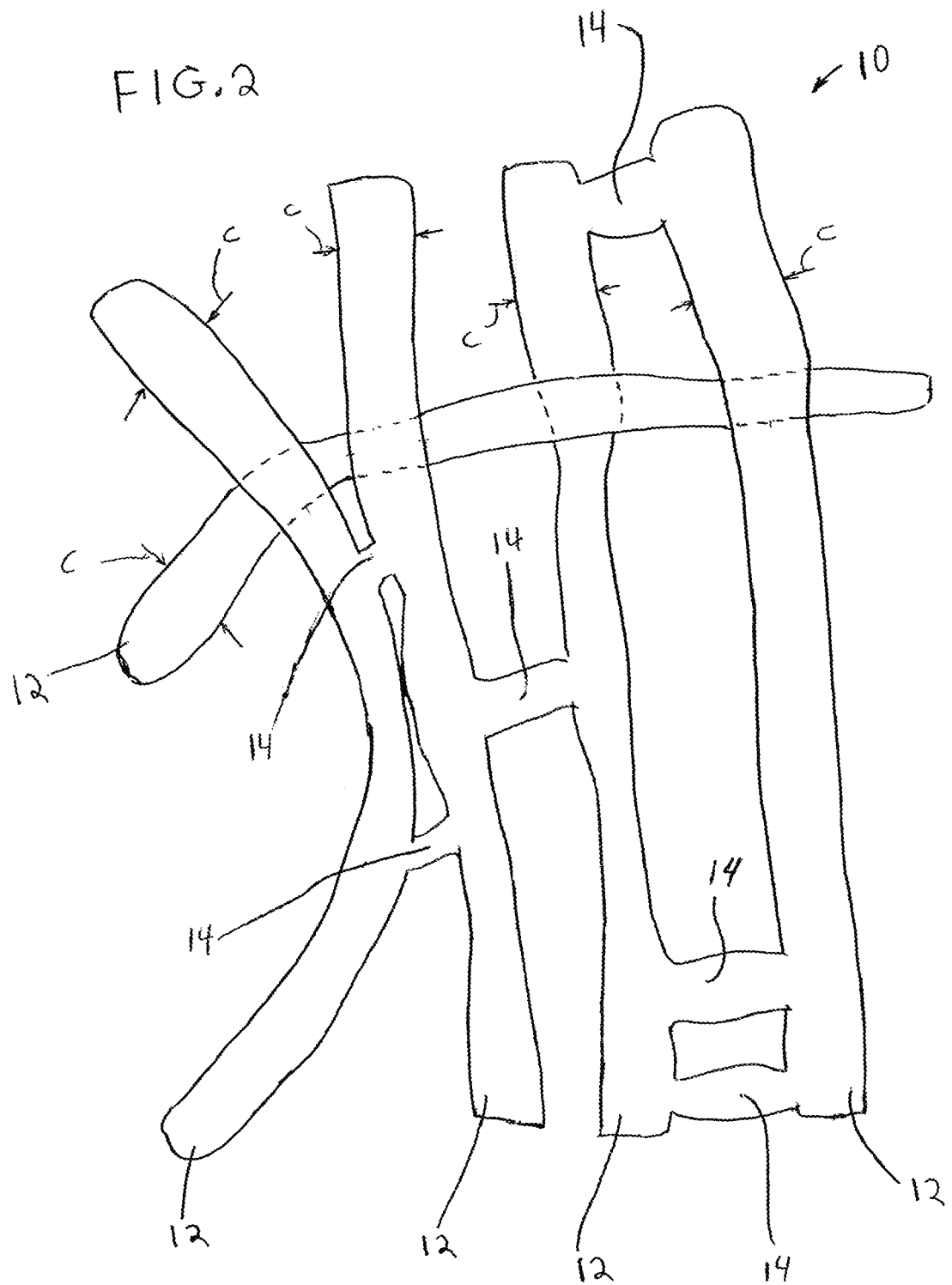
FIG. 2 is a schematic illustration of the portion of the fibrous ceramic material of FIG. 1.

FIGS. 1-2 illustrate a section of fibrous ceramic material 10 for use in insulation, refractory, protective devices, gaskets for wet and dry sealing and fuel cell applications. As described in detail below, the fibrous ceramic material 10 has a plurality of fibers 12 entangled, in contact and interconnected with one another. The fibrous ceramic material 10 also has a plurality of connectors 14 projecting from the fibers 12 and attaching at least a portion of the fibers 12 together. The fibrous ceramic material 10 is formed by heat treating a precursor material, without the addition of dopants, using the method described in detail below. Both the precursor material and the fibrous ceramic material 10 are, for example, described herein as being comprised substantially of ceria and have a chemical composition of approximately 99 percent by weight (Wt %) or greater $CeO_2$, 0.05 Wt % $Al_2O_3$, 0.04 Wt % $SiO_2$ and 0.03 Wt % $Fe_2O_3$. Thus the fibrous ceramic material 10 contains an insignificant amount of impurities.

While the fibrous ceramic material 10 and the precursor material are described as being comprised substantially of ceria, the present invention is not limited in this regard, as fibrous forms of zirconia and alumina and combinations thereof can also be employed without departing from the broader aspects of the present invention. Although the fibrous ceramic material is described as being formed without doping, variations of the fibrous ceramic material formed with the addition of dopants are also within the scope of the present invention.

Figure 3:
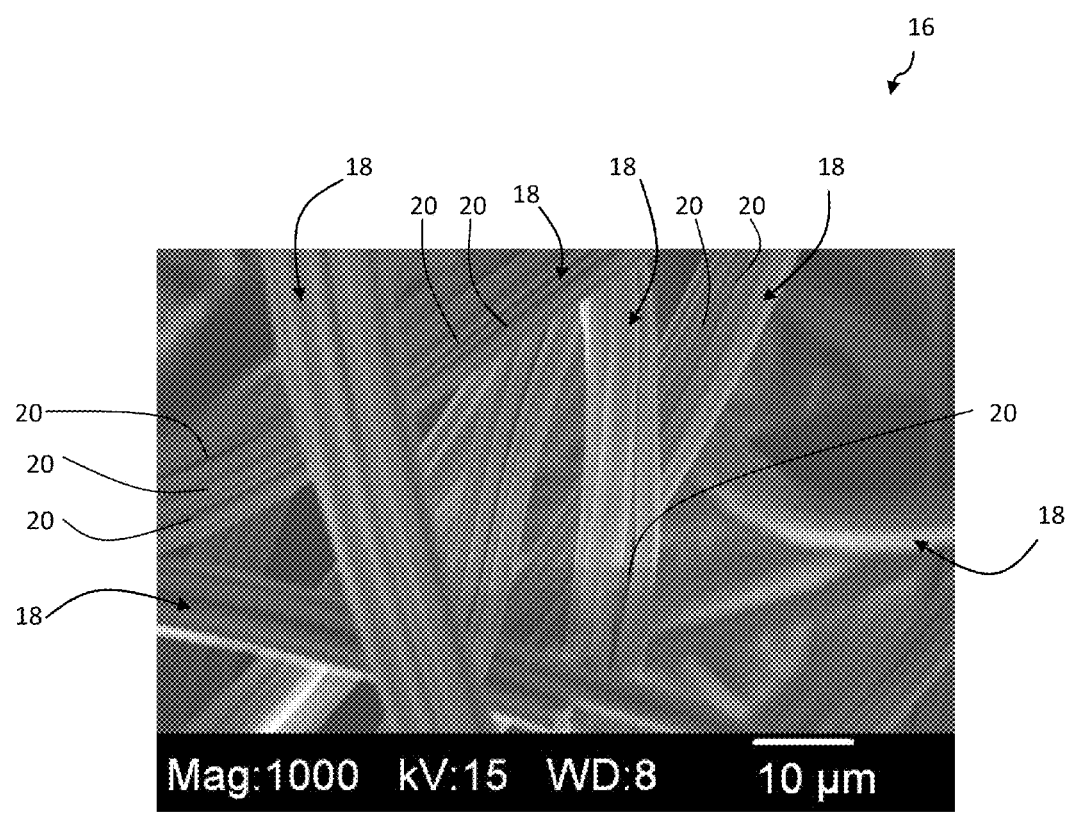
FIG. 3 is a SEM micrograph of a portion of a precursor material.
Figure 4:
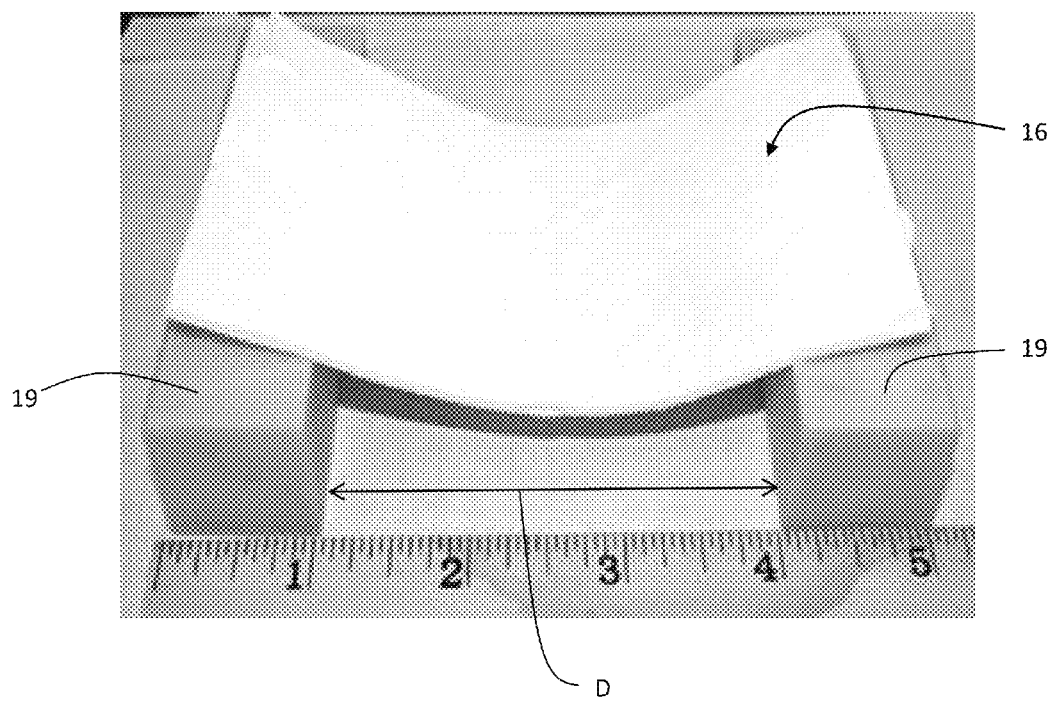
FIG. 4 is a photograph of the precursor material mounted in a test apparatus.

As shown in FIGS. 3 and 4, the precursor material 16 includes a plurality of precursor fibers 18 which have submicron sized crystallites (i.e., grain size less than 1.0 micron) are entangled and in contact with one another as a result of a forming process to create a generally pliable material which has significant sag. For example, the precursor material cannot support its own weight and has essentially no stiffness when laid horizontally between two supports 19 spaced apart by a distance D of about 3 inches. The precursor fibers 18 in the precursor material 16 are not attached to one another. In addition, the precursor material 16 has a porosity of about 96 percent and deforms substantially when subjected to compressive loads. The precursor material 16 shown in FIGS. 3 and 4 is type CeF-100 ceria felt, manufactured by Zircar Zirconia, Inc. of Florida, N.Y.

Figure 5:
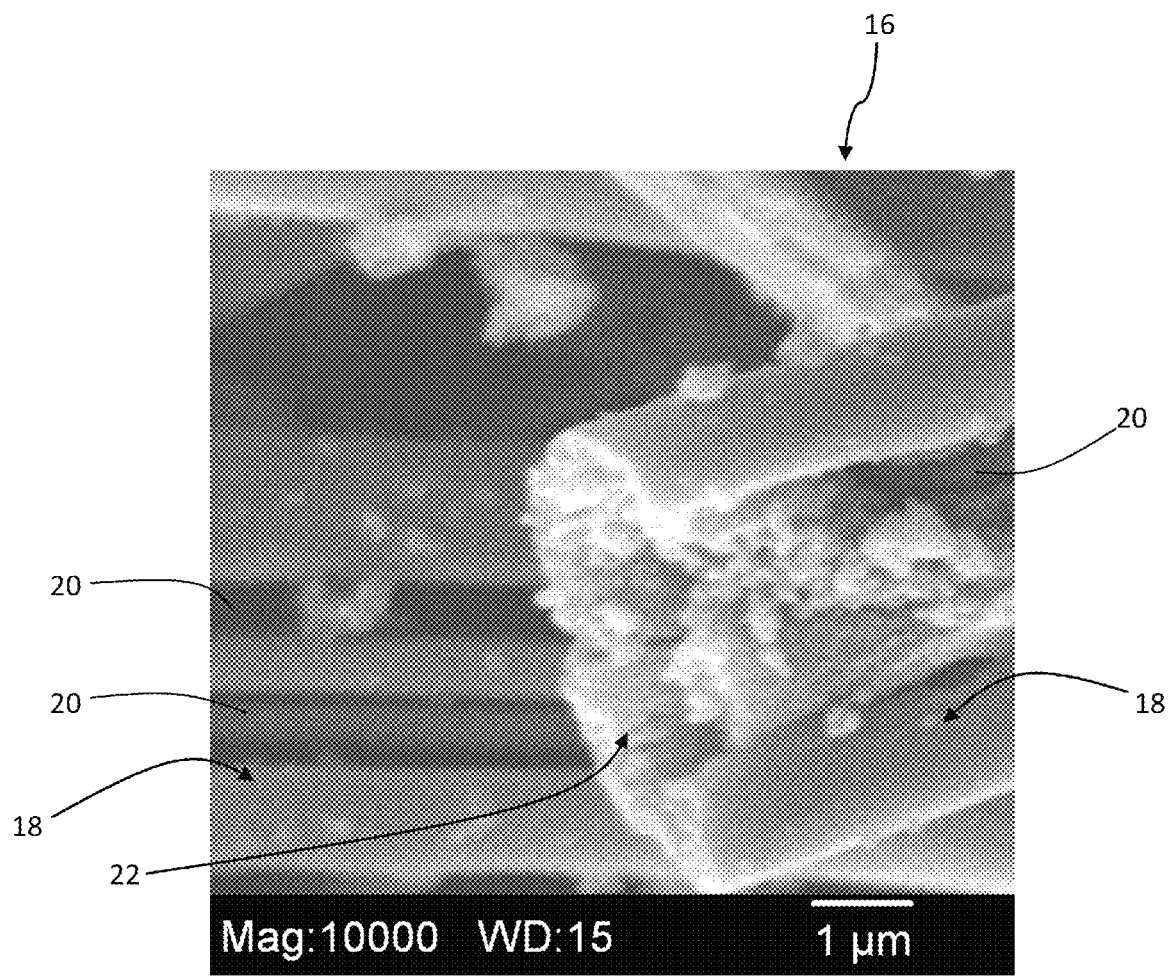
FIG. 5 is a SEM micrograph of a section of the precursor material.
Figure 6:
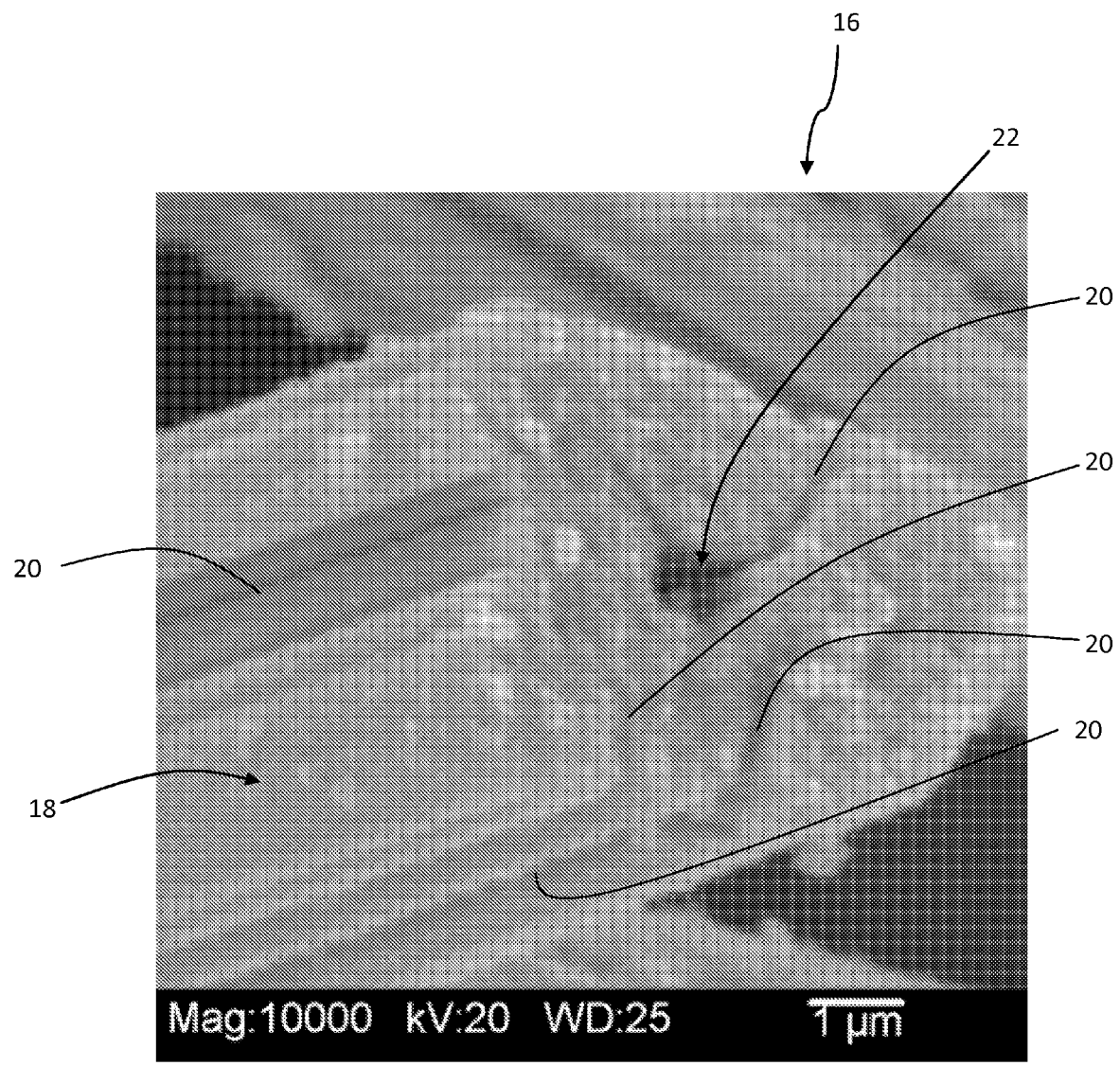
FIG. 6 is a SEM micrograph of an end portion of one of the ceramic fibers of the precursor material.

As shown in FIGS. 3, 5 and 6, the precursor fibers 18 have a fine grain micro structure comprised of many submicron crystallites resulting in a generally rough fiber surface. The precursor fibers 18 have a plurality of grooves 20 longitudinally formed therein. In addition, the precursor fibers 18 have a centrally located passage 22 formed therein and extending longitudinally therethrough. The grooves 20 and the passage 22 provide storage sites such as capillaries for liquids which come in contact with the precursor material 16. Thus the precursor material 16 has a high wettability compared to materials having solid fibers with smooth surfaces. As described in U.S. Pat. No. 6,514,636, dielectrics with rough surfaces act as a capillary medium and in fuel cell applications increase electrolyte creepage rate, which as described below can degrade fuel cell performance.

Figure 7:
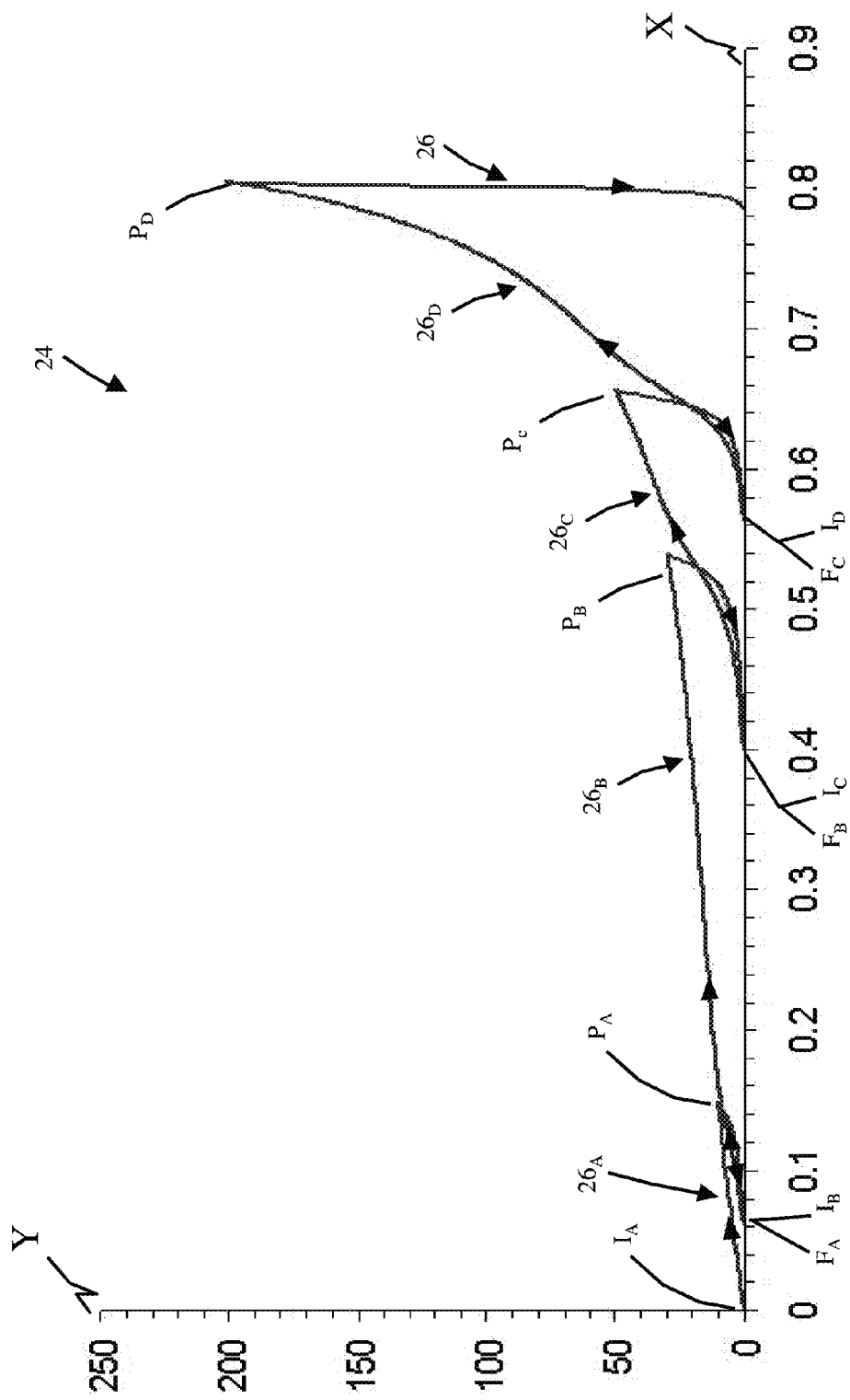
FIG. 7 is a stress versus strain graph for the precursor material.

As shown if FIG. 7, a graph 24 includes an X axis which represents strain in inches per inch (in/in) of a fibrous zirconia felt, such as ZYF100 zirconia felt manufactured by and as received from Zircar Zirconia, Inc. of Florida, N.Y. The ZYF100 zirconia felt is one example of a material for use as the precursor material 16. The graph 24 also includes a Y axis which represents compressive load in pounds per square inch (psi) from 0 to 200 psi applied to the fibrous zirconia felt. The graph 24 further includes a curve 26 which defines the strain of the fibrous zirconia felt in response to the compressive load applied to thereto. The curve 26 also illustrates the strain as the compressive load is decreased. In particular, the curve 26 has four segments 26A-D illustrating the strain of the fibrous zirconia felt in response to successive applications and releases of the compressive load. The initial ($I_A$, $I_B$, $I_C$, $I_D$), peak ($P_A$, $P_B$, $P_C$, $P_D$) and final ($F_A$, $F_B$, $F_C$, $F_D$) compressive stress and strain for each of the curve segments 26A-D is shown on the graph 24 and in Table 1.

TABLE 1

| | Initial State Strain(in/in)/ Stress (psi) | Peak State Strain (in/in)/ Stress (psi) | Final State Strain (in/in)/ Stress (psi) | Compliance (Peak Strain − Final Strain) (in/in) |
|---|---|---|---|---|
| Segment 26A | 0.0/0.0 | 0.15/20 | 0.05/0 | 0.1 |
| Segment 26B | 0.05/0.0 | 0.55/35 | 0.4/0.0 | 0.15 |
| Segment 26C | 0.4/0.0 | 0.65/50 | 0.55/0.0 | 0.1 |
| Segment 26D | 0.55/0.0 | 0.8/200 | 0.78/0.0 | 0.02 |

In addition, Table 1 lists the compliance of the fibrous zirconia felt for each of the curve segments 26A-D. Compliance is defined as the difference between the peak strain corresponding to an applied compressive load and the final strain after the compressive load is reduced to zero. Compliance data for a material indicates the extent to which a material can "spring back" to its original thickness after being compressed. Compliance of a material is considered in gasket applications where the gasket partially crushes when compressed between two surfaces. Compression or crushing of the gasket is desired to fill and conform to the irregularities of the two surfaces thereby providing a seal therebetween. Sealing capability of a gasket increases with increasing compressive load applied to the gasket. However, materials with low compressive strength will be limited in the amount of compressive load that can be applied before the gasket strain is too high to afford proper sealing.

For example, FIG. 7 and Table 1 illustrate that, when subjecting the zirconia felt to compressive loads below about 50 psi, the strain is 0.55 in/in or less and the compliance is about 0.1 in/in to about 0.15 in/in. However, when the compressive load is increased to about 200 psi, the zirconia felt essentially collapses to a solid form having a strain of about 0.8 in/in and essentially no compliance. Gasket materials with high compliance values can maintain the seal when the gasket is compressed as well as when the compressive load decreases. This sealability is attributed to the high compliance material being able to expand rather than remain crushed when the compressive load is decreased. High compliance values and high compressive strength are therefore desirable mechanical properties of gasket materials. However, the fibrous zirconia felt of FIG. 7 and Table 1 have relatively low compressive strength and essentially no compliance at high compressive loads, in comparison to the fibrous ceramic material 10, the mechanical properties of which are described below.

While the graph 24 illustrates generally poor compliance of the fibrous zirconia felt, the compliance of a precursor ceria material is less than that of the fibrous zirconia felt.

As shown in FIGS. 1 and 2, the fibers 12 in the fibrous ceramic material 10 are entangled, in contact and interconnected with one another after the heat treatment. The fibers 12 contained within the fibrous ceramic material 10 each have a cross section C of about 5 micrometers to about 15 micrometers and preferably about 8 micrometers to about 12 micrometers. Each of the fibers 12 defines a generally smooth outer surface which resists the retention of liquids. As a result of the heat treatment, the size of the crystallites are modified from sub-micron crystallites in the precursor material 16 to crystallites in the fibrous ceramic material 10, that are at least equal to the cross section C of the fiber 12. Thus at least one of the fibers 12 has a grain size at least equal to the cross section C. The larger grain size results in a generally smooth outer surface of the fibers 12, which reduces wettability and liquid absorption compared to the precursor material 16. In addition, the interconnection of the fibers 10 results in improved mechanical strength of the fibrous ceramic material 10, when compared to the precursor material 16, the fibers 18 of which have a finer-grain structure, a rough outer surface, high wettability and higher liquid absorption.

FIG. 1 illustrates one connector 14 projecting between and attaching the fibers 12. FIG. 2 shows six connectors 14 projecting between and attaching the fibers 12. The connectors 14 are formed by a heat treatment process described in detail below. In the illustrated embodiment, the connectors 14 and the fibers 12 are attached in a truss-like configuration. During heat treating, micro-structural changes occur to the precursor fibers 18 and the fibers 12 wherein crystallites or grains therein are caused to grow outwardly therefrom thereby forming the connectors 14. The heat treatment causes grain growth in the connectors 14 such that the connectors attach to other connectors and/or the fibers 12. Thus the connectors 14 and the fibers 12 share common crystallites or grains. Entangling the fibers 12 with one another, attaching the fibers and/or the connectors 14 with one another, and/or having the fibers in contact with one another, constrains relative movement between the fibers in response to an applied load. In addition, as a result of the heat treatment, the fibrous ceramic material 10 becomes denser than the precursor material 16. For example the fibrous ceramic material 10 has a porosity of about 80 to about 90 percent and preferably about 85 to about 88 percent.

While the fibrous ceramic material 10 is shown to include five fibers 12 each having a cross section of about 5 to 15 micrometers, the present invention is not limited in this regard, as any number of fibers and fibers having other cross sections can be employed. While six connectors 14 are shown, the present invention is not limited in this regard as the present invention can include any number of connectors joining any number of the fibers. While the connectors 14 are shown extending between and attaching the fibers 12 to one another, the present invention is not limited in this regard, as the fibers can attach to one another.

Figure 8:
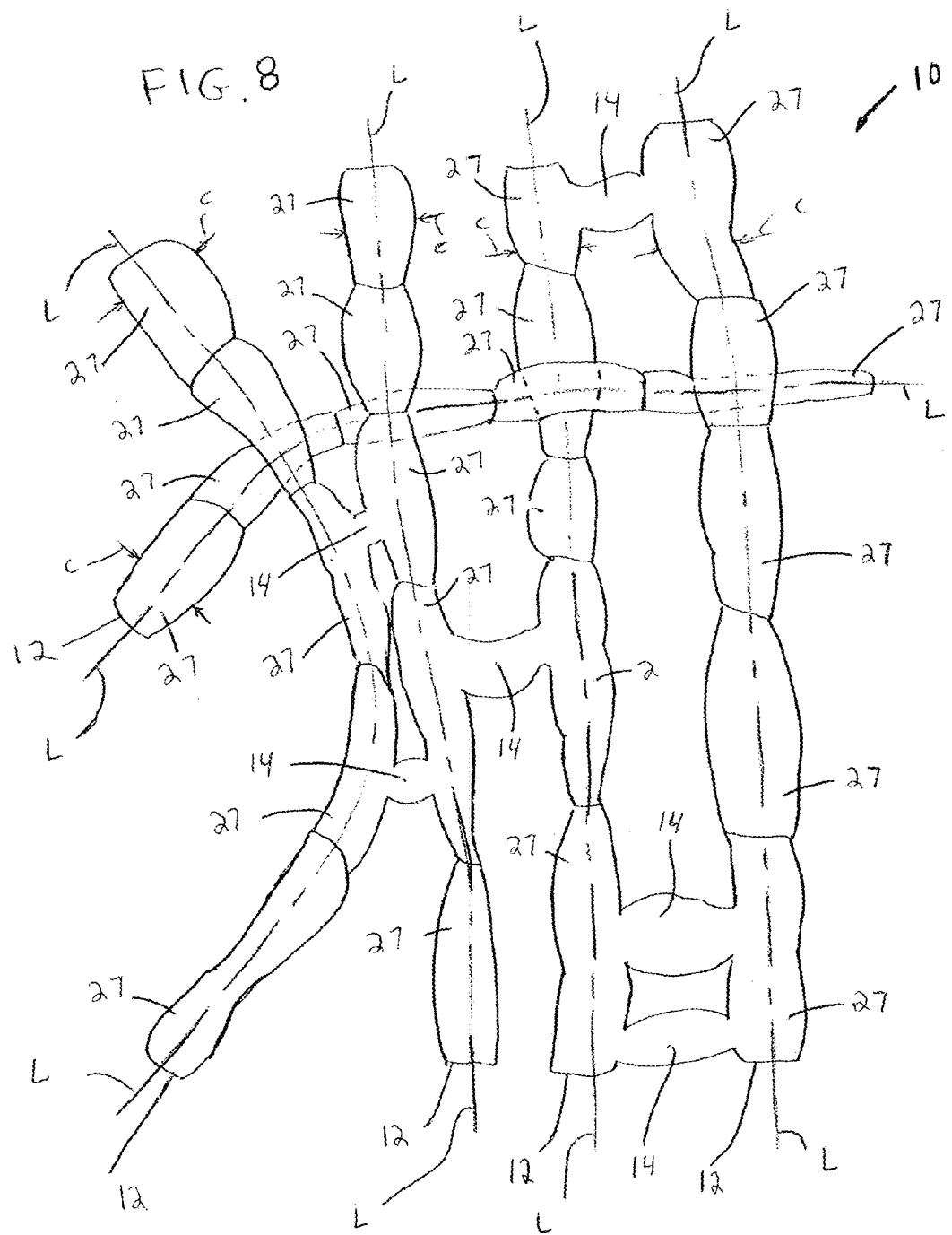
FIG. 8 is a schematic illustration of the portion of the gasket of FIG. 1 showing segmentation of the fibers.

Referring to FIG. 8, each of the fibers 12 is shown having five segments 27 longitudinally connected to one another in an end-to-end configuration along the respective longitudinal axes L. Nine of the segments 27 are shown having connectors 14 projecting between and attaching the fibers 12. The fibers 12 and connectors 14 are attached to one another in a truss-like configuration. Entangling the fibers 12 with one another, attaching the segments 27 and fibers to one another by the connectors 14, and having the fibers in contact with and/or connected to one another, constrains relative movement between the fibers in response to an applied load.

While each of the fibers 12 is shown having five segments 27, the present invention is not limited in this regard as fibers having any number of segments can be employed without departing from the broader aspects of the present invention. While nine of the segments 27 are shown having connectors projecting therefrom, the present invention is not limited in this regard as any number of segments having any number of connectors projecting therefrom can be employed.

Figure 9:
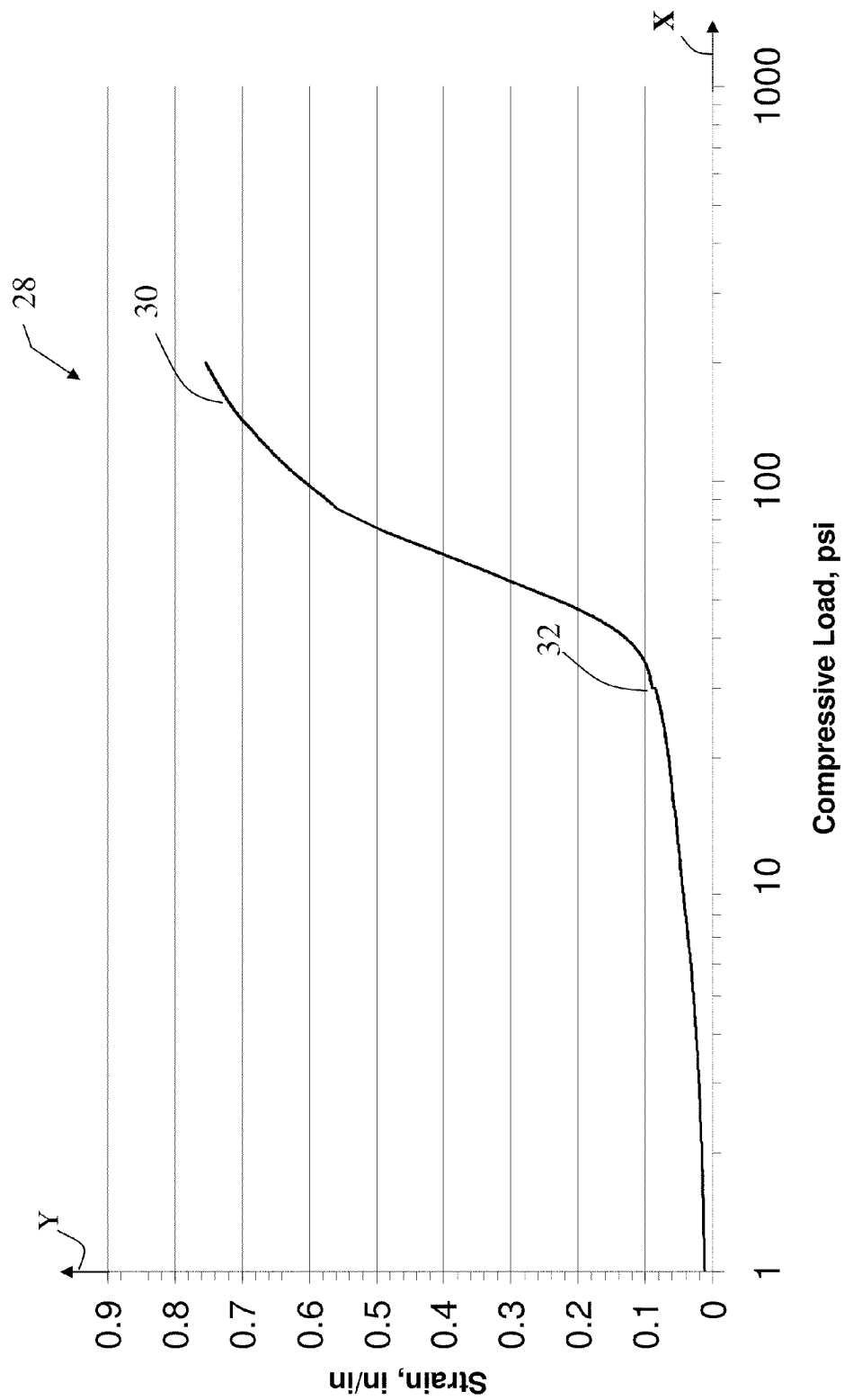
FIG. 9 is a strain versus compressive stress graph for the fibrous ceramic material.

As shown in FIG. 9 a graph 28 includes an X axis which represents a log scale of compressive load in pounds per square inch (psi) from 1 to 1000 psi applied to the fibrous ceramic material 10. The graph 28 also includes a Y axis which represents strain of the fibrous ceramic material 10 in inches per inch (in/in) from zero to 1.0 in/in. The graph 28 further includes a curve 30 which defines the strain of the fibrous ceramic material 10 in response to the compressive load applied to the fibrous ceramic material for one heat treated sample of precursor material 16. In particular, the curve 30 has a knee 32 which illustrates that the strain of the fibrous ceramic material is about 0.1 in/in at a compressive load of about 30 psi. The curve also shows that the strain is about 0.3 at a compressive load of about 55 psi.

While the curve 30 of FIG. 9 illustrates a strain of about 0.1 in/in at about 30 psi and a strain of 0.3 at about 55 psi, it is recognized that the curve provides exemplary test data for heat treatment of one sample of precursor material. Heat treatment of other precursor material results in other fibrous ceramic materials having strains less than or equal to 0.1 in/in at 30 psi, less than or equal to 0.3 in/in at 55 psi and in general strains less than or equal to those defined by the curve 30. The strain of the fibrous ceramic material 10, after heat treatment, is less than or equal to the strain of the precursor material 16 used to make the fibrous ceramic material, for corresponding stress levels greater than or equal to 30 psi.

Figure 10:
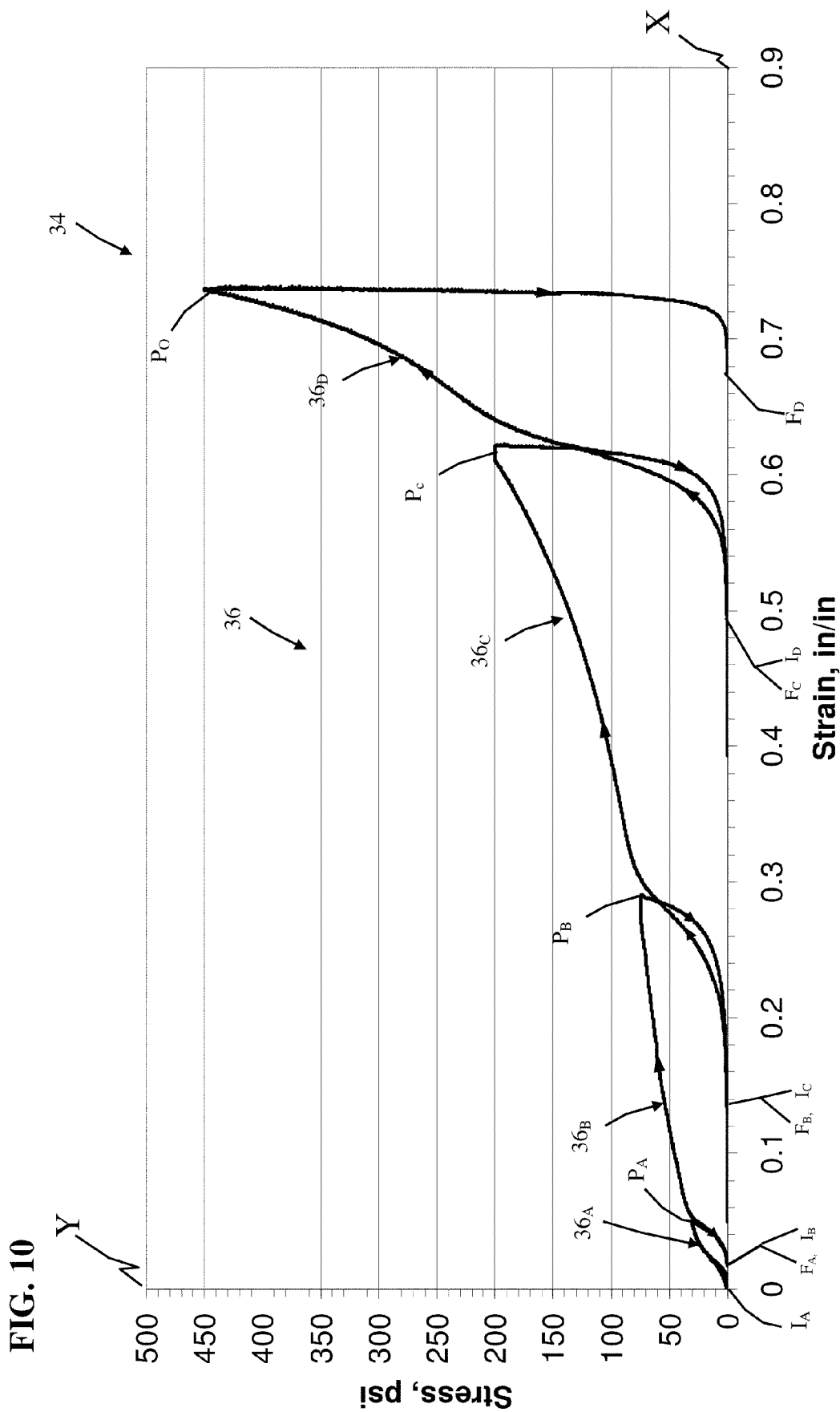
FIG. 10 is a stress versus strain graph for the fibrous ceramic material.

As illustrated in FIG. 10 a graph 34 includes an X axis which represents strain in inches per inch (in/in) of the fibrous ceramic material 10 after heat treating. The graph 34 also includes a Y axis which represents compressive load in pounds per square inch (psi) from 0 to 450 psi applied to the fibrous ceramic material 10. The graph 34 further includes a curve 36 which defines the strain of the fibrous ceramic material 10 in response to the compressive load applied to thereto. The curve 36 also illustrates the strain as the compressive load is decreased. In particular, the curve 36 has four segments 36A-D illustrating the strain of the fibrous ceramic material 10 in response to successive applications and releases of compressive load. The initial ($I_A$, $I_B$, $I_C$, $I_D$), peak ($P_A$, $P_B$, $P_C$, $P_D$) and final ($F_A$, $F_B$, $F_C$, $F_D$) compressive stress and strain for each of the segments 36A-D is shown on the curve 36 and in Table 2. In addition, Table 2 lists the compliance of the fibrous ceramic material 10 for each of the segments 36A-D.

TABLE 2

| | Initial State Strain(in/in)/ Stress (psi) | Peak State Strain (in/in)/Stress (psi) | Final State Strain (in/in)/Stress (psi) | Compliance (Peak Strain − Final Strain) (in/in) |
|---|---|---|---|---|
| Segment 36A | 0.0/0.0 | 0.04/25 | 0.02/0.0 | 0.02 |
| Segment 36B | 0.02/0.0 | 0.28/75 | 0.14/0.0 | 0.14 |
| Segment 36C | 0.14/0.0 | 0.61/200 | 0.50/0.0 | 0.11 |
| Segment 36D | 0.50/0.0 | 0.72/450 | 0.69/0.0 | 0.03 |

As shown in FIG. 10, the fibrous ceramic material 10 has a compliance of approximately 0.11 after being subject to a compressive load of approximately 200 psi. In addition the fibrous ceramic material 10 has greater compressive strength than that of the fibrous zirconia felt. The fibrous ceramic material 10 has utility in gasket applications where high compressive stresses are required. For example, the fibrous ceramic material 10 is well suited for high temperature gasket applications where the compressive loads applied to the gasket by opposing surfaces periodically vary due to thermal transients. In particular, the fibrous ceramic material's 10 high compliance allows it to expand when the compressive load is decreased thereby maintaining a seal between the opposing surfaces.

While the curve 36 and Table 2 illustrate the stress versus strain relationship for a particular heat treatment of one sample of precursor material 16, heat treatment of other samples of the precursor material results in other fibrous ceramic materials having strains less than or equal to those defined by the curve 36, for corresponding values of stress. The strain of the fibrous ceramic material 10, after heat treatment, is less than or equal to that of the precursor material 16 used to make the fibrous ceramic material, for corresponding stress levels greater than or equal to 30 psi.

Figure 11:
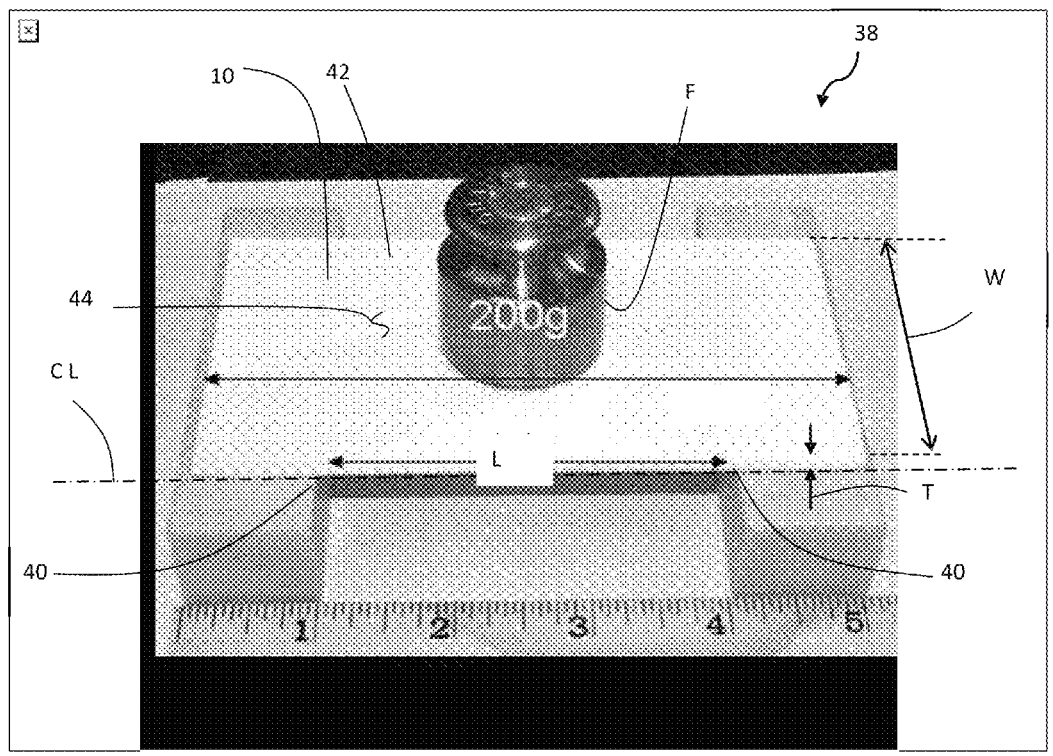
FIG. 11 is a photograph of the fibrous ceramic material in a testing apparatus.
Figure 12:
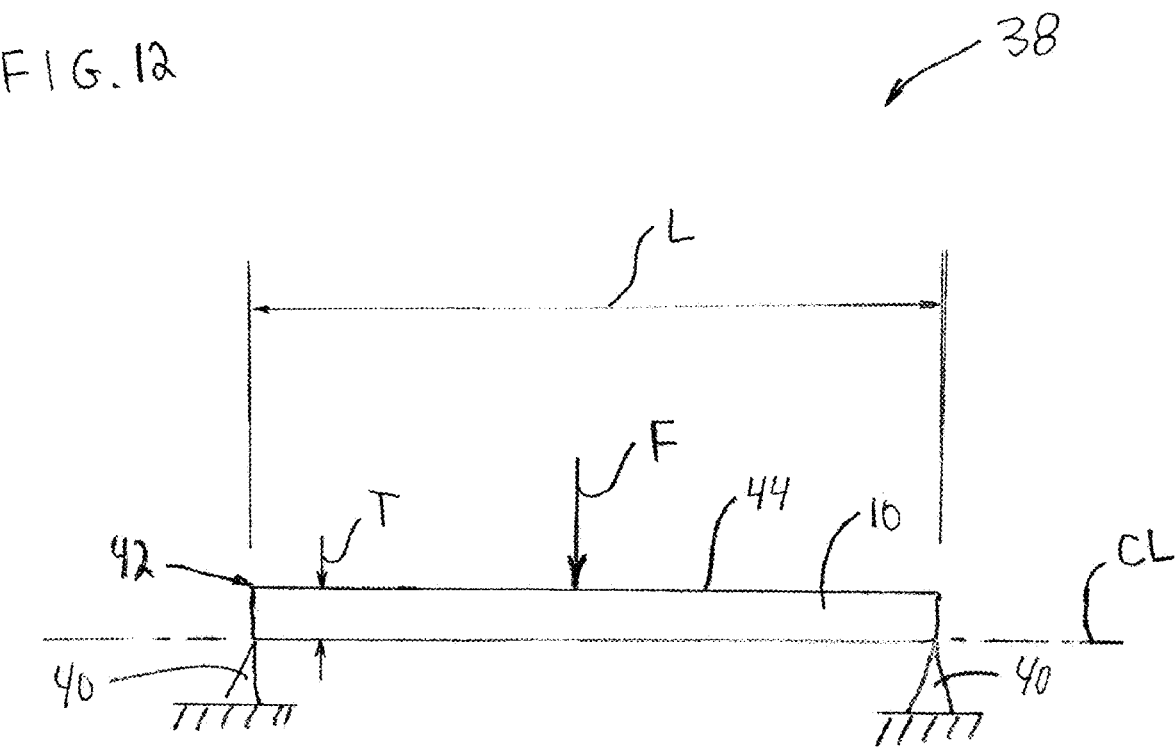
FIG. 12 is a schematic illustration of the fibrous ceramic material in the testing apparatus of FIG. 11.

Referring to FIGS. 11 and 12, a testing apparatus 38 includes two mounting points 40 spaced apart by a distance L of approximately three inches. A test specimen 42 having a thickness T of approximately 0.06 inches and made of the fibrous ceramic material 10 is placed on the mounting points 40 along a reference line CL. The test specimen 42 has a length L of about three inches and a width W of about 2.875 inches. Therefore the test specimen 42 has a surface area 44, between the mounting points 40, of about 8.625 square inches. A load F of approximately 200 grams is applied in a direction substantially perpendicular to the surface area 44. The test specimen 42 has insignificant deflection from the reference line CL, with the load F applied. Based on the above, the test specimen 42 has insignificant sag at a load of less than or equal to approximately 23.2 grams per square inch. Thus after the fibrous ceramic material 10 is formed into a gasket having a particular shape, the gasket is semi-rigid and the shape is substantially self sustaining, for example, the gasket has insignificant sag.

Figure 13:
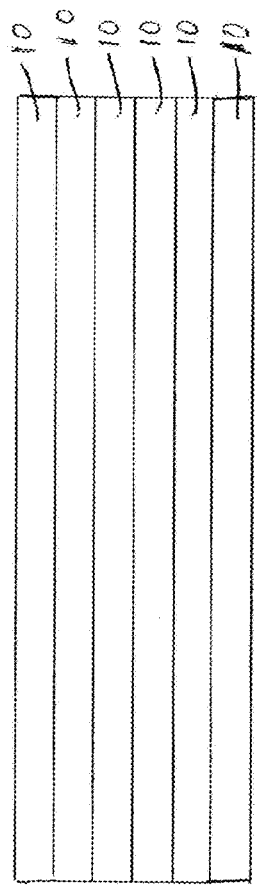
FIG. 13 is a schematic illustration of a cross section of a fibrous ceramic laminate.

Referring to FIG. 13, a fibrous ceramic laminate 50 includes six layers of the fibrous ceramic material 10 attached to one another. Each layer of fibrous ceramic material 10 is configured similar to the fibrous ceramic material 10 described above and illustrated in FIGS. 1, 2 and 8-12. Thus each layer of fibrous ceramic material 10 includes a plurality of fibers 12 entangled with one another and a plurality of connectors 14 projecting between and attaching the fibers. The connectors 14 are formed by heat treating the precursor material 16. In addition, the heat treatment causes the connectors 14 to attach to other connectors and the fibers 12 and the fibers to connect to one another.

Figure 14:
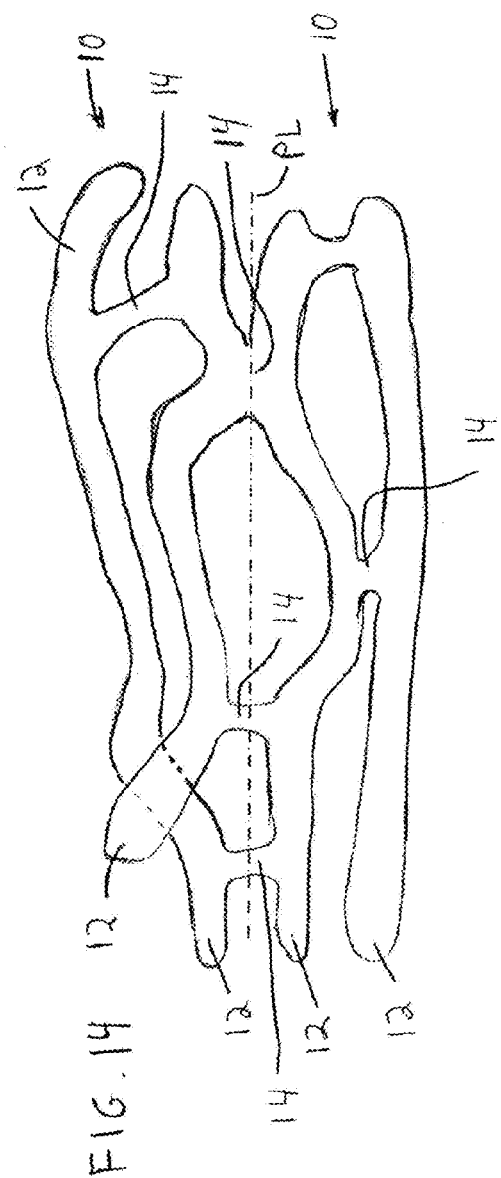
FIG. 14 is an enlarged view of a portion of the fibrous ceramic laminate of FIG. 13.

As shown in FIG. 14, two layers of the fibrous ceramic material 10 are attached to one another along a common plane PL. The heat treatment causes connectors 14 to project between the fibers 12. The heat treatment also causes the connectors 14 to extend across the common plane PL. Moreover, the heat treatment causes the connectors 14 to attach the fibers 12 to one another. The connectors 14 attach the fibers 12 and/or connectors to one another. Thus the fibers 12 and the connectors 14 are joined in a truss-like configuration.

While FIGS. 13 and 14 illustrate six and two layers of the fibrous ceramic material 10, respectively, attached to one another, the present invention is not limited in this regard as any number of layers can be attached, bonded, fused, or adhered to one another without departing from the broader aspects of the present invention.

Figure 15:
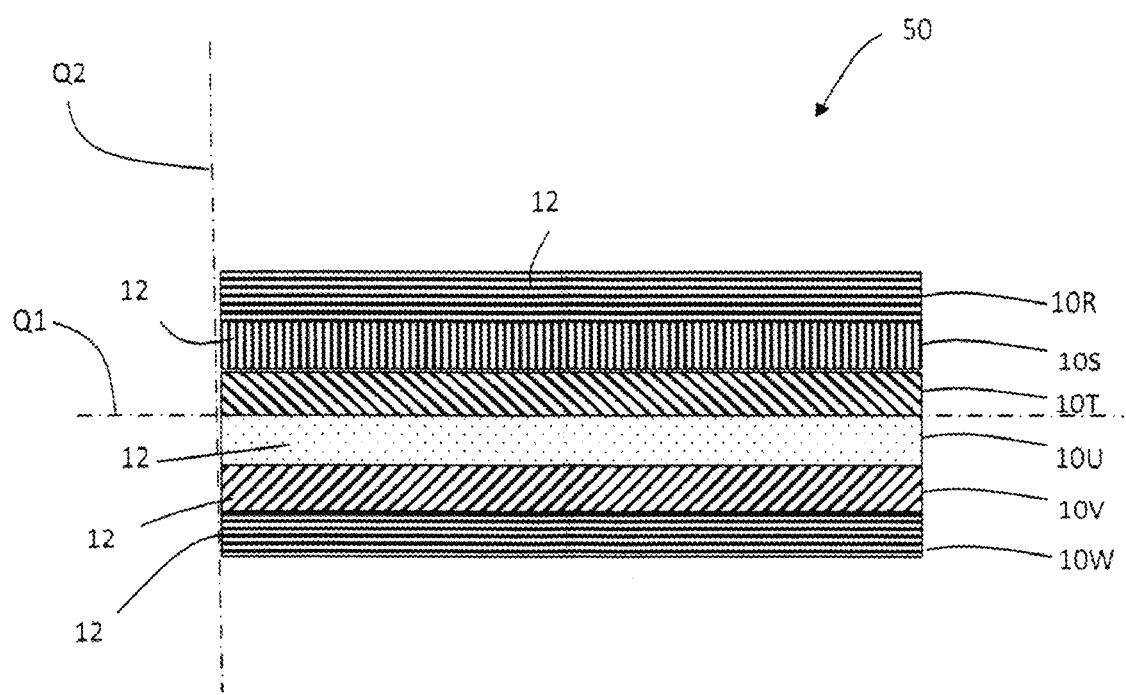
FIG. 15 is a schematic illustration of an asymmetric configuration of the fibrous ceramic laminate.

As shown in FIG. 15, the fibrous ceramic laminate 50 includes six asymmetrically oriented layers 10R, 10S, 10T, 10U, 10V and 10W of the fibrous ceramic material 10. In layers 10R and 10W the fibers 12 are generally parallel to a reference line Q1 and generally perpendicular to another reference line Q2. The fibers 12 of layer 10S are aligned generally perpendicular to the reference line Q1 and generally parallel the reference line Q2. The fibers 12 of layers 10T and 10V are oriented approximately + and −45 degrees, respectfully, away from reference lines Q1 and Q2. The fibers 12 of layer 10U are aligned generally perpendicular to reference lines Q1 and Q2.

While FIG. 15 illustrates six asymmetrically oriented layers having five different fiber orientations, the present invention is not limited in this regard as any orientation of fibers and combinations of asymmetrically oriented layers can also be employed without departing from the scope of the present invention.

The present invention also resides in a method for manufacturing a fibrous ceramic material. The method includes the step of providing a precursor material having a plurality of entangled fibers. Precursor materials include but are not limited to those comprising ceria, zirconia and/or alumina. Preferably, the precursor material is a pliable CeF-50 ceria felt commercially available from Zircar Zirconia, Inc. of Florida, N.Y. as described above. A holder is provided, for example a holder manufactured from alumina having a purity greater than 96 percent by weight (Wt %).

Attempts to heat treat the precursor material, at temperatures above 1500 degrees Celsius, on holders made of high purity alumina (i.e., 96 Wt % alumina or less) have been unsuccessful, because the precursor material sticks to the holder. Although 96 Wt % alumina was not suitable for use as a holder for heat treating the precursor material, experimentation determined, unexpectedly, that alumina having a purity greater than 96 Wt %, for example 99 Wt % is a suitable material for the holder used for heat treating the precursor material. Thus preferably, the holder is manufactured from alumina having a purity of greater than about 99 Wt %, such as a Nextel 610 1500 denier, part No. XN-694 by 3M Corporation. In addition, attempts to heat treat the precursor material on refractory brick have been made but were also unsuccessful. For example, heat treating the precursor material on a holder made of refractory brick (e.g., refractory brick including alumina oxide, silicon dioxide, sodium, potassium, and/or calcium) at temperatures above 1500 degrees Celsius resulted in the precursor material reacting with and/or becoming absorbed by the refractory brick.

The precursor material is placed on the holder and heated to a temperature of about 1500 degrees Celsius to about 1700 degrees Celsius to form the fibrous ceramic material. The precursor material is heated at least until the precursor material reaches the temperature (i.e., about 1500 to about 1700 degrees Celsius). Preferably, the precursor material and the holder are heated to a temperature of about 1600 degrees Celsius to about 1650 degrees Celsius.

Heating the precursor material causes a plurality of connectors to project between the fibers and/or one or more of the connectors to attach the fibers and/or connectors to one another. The heat treatment causes micro-structural changes in the precursor fibers and the fibers wherein crystallites or grains therein grow outwardly therefrom to form the connectors. The heat treatment causes grain growth in the connectors such that the connectors attach to other connectors and/or adjacent fibers. Thus the connectors and the fibers share common crystallites or grains. The attachment of the connectors with other connectors and/or the fibers results in a truss like structure within the fibrous ceramic material. Entangling the fibers with one another and attaching the fibers and/or the connectors to one another, and/or having the fibers connected to and/or in contact with one another, constrains relative movement between the fibers in response to an applied load. Heating also causes the fiber grain growth so that the grain size becomes at least the diameter of the fiber. Such grain structure creates a generally smooth outer surface that reduces wettability and liquid absorption, compared to the precursor material which has a finer-grain structure, rougher fiber surface and high liquid absorption capability.

Heat treating the precursor material as described above to form the fibrous ceramic material has utility in that the precursor material does not substantially react with, become absorbed by or stick to the holder. In addition, the heat treating method creates the fibrous ceramic material having improved mechanical properties as discussed in detail above.

While the precursor material is described as being pliable CeF-50 ceria felt commercially available from Zircar Zirconia, Inc., the present invention is not limited in this regard, as other precursor materials are suitable for use in the present method, including but not limited to Zircar Zirconia, Inc.'s CeF-100 felt, CeK-15 tricot knit cloth, CeW-15 square weave cloth, CeW-30 satin weave cloth, and ceria fabrics provided by other manufacturers. Although the holder is said to be manufactured from alumina having a purity greater than 96 Wt % and preferably greater than about 99 Wt %, the present invention is not limited in this regard as other materials are suitable for use in the present method, including but not limited to stainless steel and materials coated with alumina having a purity greater than 96 Wt %.

Figure 16:
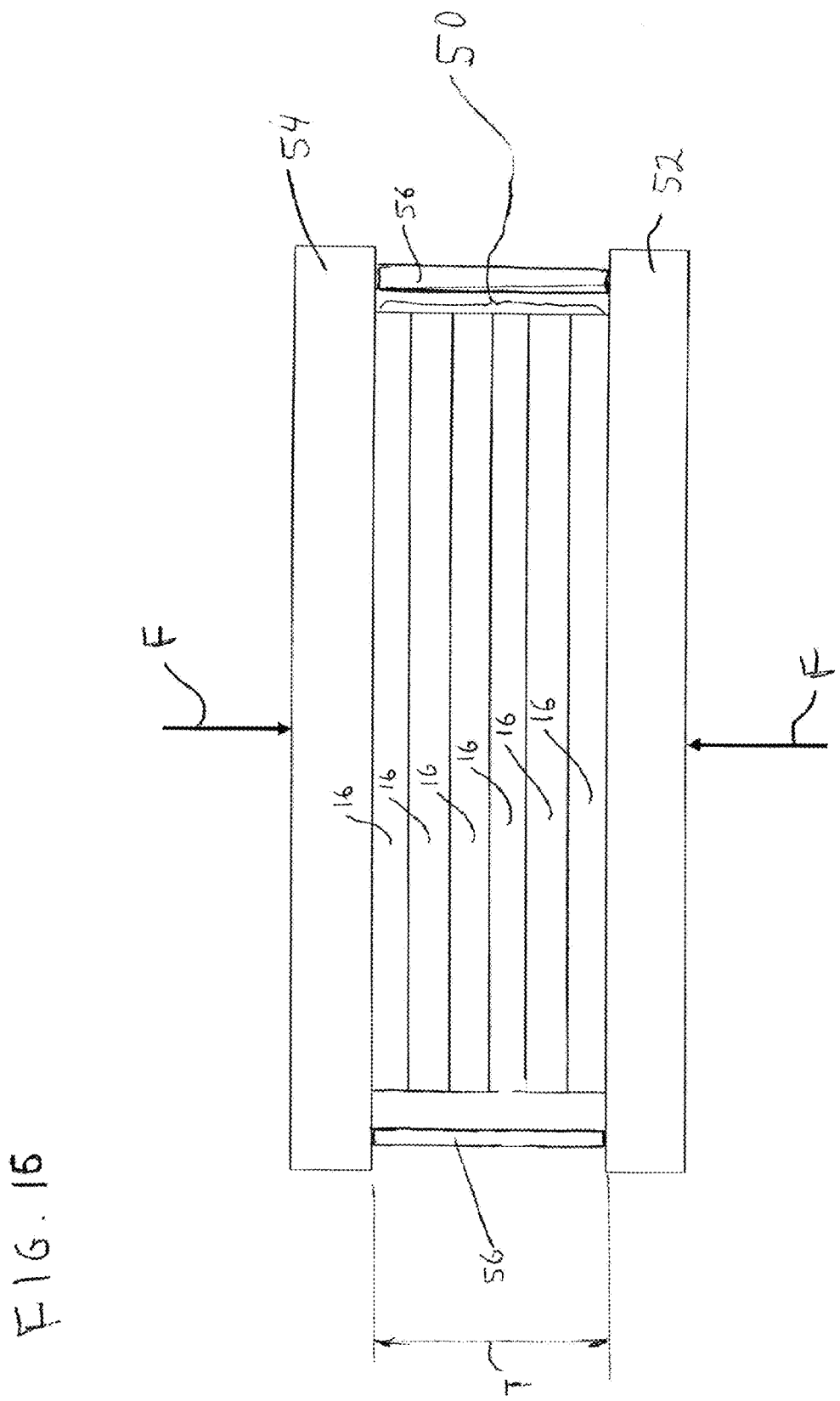
FIG. 16 is a schematic illustration of the fibrous ceramic laminate of FIG. 13 compressed between two holders.

Referring to FIG. 16, a method of manufacturing a fibrous ceramic laminate 50 includes providing six layers of precursor material 16 each having a plurality of entangled fibers. In addition, a first holder 52 and a second holder 54 are provided. The first and second holders, 52 and 54, respectively are manufactured from alumina having a purity of greater than 96 Wt %. Preferably, the first and second holders 52, 54 are manufactured from alumina having a purity of greater than about 99 Wt %. The six layers of precursor material 16 are stacked between the first and second holders 52, 54. The method includes compressing the six layers of precursor material to a predetermined thickness T, by applying compressive forces F to the first and second holders 52, 54. The predetermined thickness T is controlled by the use of one or more stops 56 disposed between the first and second holders. The predetermined thickness is selected depending on the requirements for porosity, compliance and density of the fibrous ceramic laminate. The six layers of precursor material 16 and the first and second holders 52, 54 are heated to between about 1500 degrees Celsius and about 1700 degrees Celsius. Preferably, the six layers of precursor material 16 and the first and second holders are heated to between about 1600 degrees Celsius and about 1650 degrees Celsius. This causes connectors to project from the fibers and to attach the fibers to one another. The heat treatment causes the six layers of precursor material 16 to become six layers of fibrous ceramic material attached to one another thereby forming the fibrous ceramic laminate.

While the six layers of fibrous ceramic material are described as being attached to one another, the present invention is not limited in this regard as the layers of fibrous ceramic material can be bonded, fused, or adhered to one another without departing from the broader aspects of the present invention. While the fibrous ceramic laminate is described and shown as being manufactured from six layers of precursor material, the present invention is not limited in this regard, as any number of layers can be compressed and heat treated with the present method, including one or more layers. While the method is described as including the step of compressing the layers between the first and second holders, the present invention is not limited in this regard, as the step of compressing the layers between the first and second holders can be eliminated without departing from the broader aspects of the present invention. While the layers of precursor material are described as being stacked between the first and second holders, the present invention is not limited in this regard as other configurations can be employed, including but not limited to randomly arranging the layers of precursor material between the first and second holders, arranging the layers with the fibers of a least one layer being aligned transverse to the fibers of at least one other layer, having portions of the precursor layers disposed between the first and second holders and other portions of the precursor layers disposed outside the first and second holders.

Example

One example for use of the fibrous ceramic material 10 and/or the fibrous ceramic laminate 50 is as a gasket in a Molten Carbonate Fuel Cell (MCFC) applications. As shown in FIGS. 17 and 18, a MCFC stack 60 has six fuel cells 62 stacked in series. Each of the fuel cells 62 includes an anode 64 and a cathode 66, separated by an electrolyte 68 contained in an electrolyte matrix 70. The anode 64, the cathode 66, the electrolyte 68 and the electrolyte matrix 70 are disposed between a first collector 72 and a second collector 74, the first collector being adjacent to the anode and the second collector being adjacent to the cathode. The first and second collectors channel fuel to the anode and air to the cathode, respectively. The MCFC stack 60 has separator plates 76 disposed between adjacent fuel cells and end plates 78 disposed on opposing ends of the fuel cell stack. The MCFC stack 60 includes a negative end 80 generally opposite a positive end 82. A gasket 84 is compressed between a peripheral outer surface 86 of the MCFC stack and a gas manifold 88 secured by suitable fasteners (not shown) to a portion of the peripheral outer surface 86. The manifold is used for channeling fuel to the first collector or air to the second collector.

During operation, MCFC stacks can experience electrolyte migration which involves the loss of the electrolyte 68 from the fuel cell 62 at the positive end 82, Electrolyte migration can result in an irreversible increase in internal electrical resistance causing significant voltage drop across the fuel cell 62 and therefore decreasing the life of the MCFC stack 60. Migration of the electrolyte 68 towards the negative end 80 can cause flooding, stability problems and degraded performance. Electrolyte migration can be reduced by using fibrous ceramic material 10 gaskets instead of conventional gaskets such as gaskets consisting of the precursor material 16 because, as described below, the fibrous ceramic material 10 has substantially lower electrolyte pickup and electrolyte migration rate than the precursor material 16. The fibrous ceramic material 10 has grain size at least the diameter of the fiber. Such grain structure results in a smooth outer surface of the fiber which reduces electrolyte wettability and electrolyte absorption compared to the precursor material which has a finer grain structure that results in a rougher fiber surface having high wettability and high electrolyte absorption.

Electrolyte pickup and electrolyte migration rates can be used to quantify the ability of the gasket to mitigate electrolyte migration. Electrolyte pickup is measured in terms of the percent by volume of the electrolyte 68 which the gasket 84 can absorb. Electrolyte migration rate is measured in terms of the mass of the electrolyte 68 which migrates per unit of time and area. For sake of comparison, relative electrolyte pickup and relative electrolyte migration rates are used, with the electrolyte pickup and electrolyte migration rate for a zirconia felt, namely, ZYF100 zirconia felt as received from and manufactured by Zircar Zirconia, Inc. of Florida, N.Y., being used as a baseline. Thus the relative electrolyte pickup and relative electrolyte migration rate for zirconia felt are both 1.0.

The gaskets 84 made from the fibrous ceramic material 10 and the fibrous ceramic laminate 50 have a relative electrolyte pick-up of about 0.65 when compared to gaskets made from the zirconia felt which have a relative electrolyte pick-up of 1.0. Thus the fibrous ceramic material 10 and the fibrous ceramic laminate 50 have an electrolyte pick up about 65 percent of the amount of electrolyte picked-up by the zirconia felt. In addition, the fibrous ceramic material 10 and the fibrous ceramic laminate 50 have a relative electrolyte migration rate of about 0.3 to about 0.4 when compared to the zirconia felt which has a relative electrolyte migration rate of 1.0. Thus gaskets 84 made from the fibrous ceramic material 10 and/or the fibrous ceramic laminate 50 have electrolyte migration rates of about 30 to about 40 percent of those made from zirconia felt.

While the gasket 84 is described for use in a MCFC, the present invention is not limited in this regard as gaskets made from the fibrous ceramic material 10 and/or the fibrous ceramic laminate 50 are adaptable to any high temperature fuel cell to mitigate electrolyte migration in and seal mating surfaces (for example mating surfaces of fuel cell manifolds) of the high temperature fuel cells to improve fuel cell performance.

Although the present invention has been disclosed and described with reference to certain embodiments thereof, it should be noted that other variations and modifications may be made, and it is intended that the following claims cover the variations and modifications within the true scope of the invention.

What is claimed is:

1. A fibrous ceramic material, said fibrous ceramic material comprising:
   a plurality of fibers entangled with one another;
   at least one connector projecting from a portion of at least one of said plurality of fibers; and
   wherein said at least one connector attaches to another of said plurality of fibers so as to attach the fibers to one another, and
   wherein the plurality of fibers and at least one connector comprise crystallites and the at least one connector is formed by outward grain growth in crystallite fibers.

2. The fibrous ceramic material of claim 1, wherein at least one of said plurality of fibers has a grain size of at least that of a cross section of one of said fibers.

3. The fibrous ceramic material of claim 2, wherein said grain size is at least about 5 micrometers.

4. The fibrous ceramic material of claim 1, wherein said plurality of fibers have a smooth surface for reducing at least one of wettability and liquid absorption.

5. The fibrous ceramic material of claim 1, wherein at least one of said plurality of fibers includes a plurality of segments connected to one another in an end-to-end configuration and wherein at least a portion of said segments define at least one of said connectors extending therefrom.

6. The fibrous ceramic material of claim 1, wherein said fibrous ceramic material is sag resistant.

7. The fibrous ceramic material of claim 1, wherein said fibrous ceramic material has a strain of less than about 0.1 inches per inch at a compressive load of about 30 pound per square inch.

8. The fibrous ceramic material of claim 1, wherein said fibrous ceramic material has a strain of less than about 0.6 inches per inch at a compressive load of about 200 pound per square inch.

9. The fibrous ceramic material of claim 1, wherein said fibrous ceramic material has a compliance of up to about 0.11 inches per inch after a compressive load of up to about 200 pounds per square inch is applied to said fibrous ceramic material and subsequently reduced to about zero.

10. The fibrous ceramic material of claim 1, wherein said fibrous ceramic material has an electrolyte pickup of less than about 70 percent of the electrolyte pickup of zirconia felt.

11. The fibrous ceramic material of claim 1, wherein said fibrous ceramic material has an electrolyte migration rate of about 30 to about 40 percent of the electrolyte migration rate in zirconia felt.

12. A fibrous ceramic laminate comprising:
a plurality of layers of fibrous ceramic material comprising:
a plurality of fibers entangled with one another;
at least one connector projecting from a portion of at least one of said plurality of fibers; and
wherein said at least one connector attaches to another of said plurality of fibers so as to attach the fibers to one another, and
wherein the plurality of fibers and at least one connector comprise crystallites and the at least one connector is formed by outward grain growth in crystallite fibers.

13. A method of manufacturing a fibrous ceramic material, said method comprising the steps of:
providing a precursor ceramic material having a plurality of entangled fibers;
providing at least one holder;
placing said precursor ceramic material on one of said at least one holders; and
heating said precursor ceramic material and said holder to between about 1500 degrees Celsius and about 1700 degrees Celsius to form said fibrous ceramic material, thereby causing connectors to project from a portion of said fibers and attach said fibers to one another.

14. The method of claim 13, wherein said at least one holder is made of alumina having a purity greater than 96 percent by weight.

15. The method of claim 13, wherein said at least one holder is made of alumina having a purity greater than about 99 percent by weight.

16. The method of claim 13, further comprising the steps of:
providing stopping means;
compressing said precursor ceramic material between said one of at least one holders and another of said at least one holders; and
said stopping means limiting said compression to a predetermined magnitude.

17. The method of claim 16, wherein said limiting said compression establishes at least one of a predetermined thickness and porosity of said fibrous ceramic material.

18. A method of manufacturing a fibrous ceramic laminate, the method including the steps of:
providing a plurality of precursor layers, each of said precursor layers having a plurality of entangled fibers;
providing a first holder and a second holder;
stacking said plurality of precursor layers between said first and second holders; and
heating said plurality of precursor layers and said first and second holders to between about 1500 degrees Celsius and about 1700 degrees Celsius causing at least one connector to project from at least one of said plurality of fibers, causing said at least one connector to attach to at least one other of said plurality of fibers and causing said precursor layers to attach to one another thereby forming said fibrous ceramic laminate.

19. The method of claim 18, wherein said first and second holders are made of alumina having a purity greater than 96 percent by weight.

20. The method of claim 18, wherein said first and second holder is made of alumina having a purity greater than about 99 percent by weight.

21. The method of claim 18, wherein said plurality of precursor layers comprise at least one of ceria, zirconia, and alumina.

22. The method of claim 18, further comprising the steps of:
providing stopping means;
compressing said precursor ceramic material between said first and second holders and another of said at least one holders; and
said stopping means limiting said compression to a predetermined magnitude.

23. The method of claim 22, wherein said limiting said compression establishes at least one of a predetermined thickness and porosity of said fibrous ceramic material.

24. The method of claim 18, wherein at least one of said plurality of precursor layers has said fibers oriented different than that of another of said plurality of precursor layers.

25. A gasket for high temperature fuel cells, said gasket comprising:
a fibrous ceramic material comprising a plurality of fibers entangled with one another;
at least one connector projecting from a portion of at least one of said plurality of fibers;
wherein said at least one connector attaches to another of said plurality of fibers so as to attach the fibers to one another; and
wherein the plurality of fibers and at least one connector comprise crystallites and the at least one connector is formed by outward grain growth in crystallite fibers; and
wherein said gasket mitigates electrolyte migration in, and seals mating surfaces of, high temperature fuel cells.

26. A gasket for high temperature fuel cells, said gasket comprising:
a fibrous ceramic laminate comprising a plurality of layers of fibrous ceramic material comprising a plurality of fibers entangled with one another;
at least one connector projecting from a portion of at least one of said plurality of fibers;
and wherein at least one connector attaches to another of said plurality of fibers so as to attach the fibers to one another; and
wherein the plurality of fibers and at least one connector comprise crystallites and the at least one connector is formed by outward grain growth in crystallite fibers; and
wherein said gasket mitigates electrolyte migration in, and seals mating surfaces of, high temperature fuel cells.

27. A fuel cell system comprising:
a fuel cell stack including an anode side and a cathode side;
at least one manifold secured to a portion of a peripheral outer surface of said fuel cell stack; and a gasket in accordance with claim 25 compressed between said peripheral outer surface of said stack and said manifold.

28. A fuel cell system comprising:
a fuel cell stack including an anode side and a cathode side;
at least one manifold secured to a portion of a peripheral outer surface of said fuel cell stack; and
a gasket in accordance with claim 26 compressed between said peripheral outer surface of said stack and said manifold.

29. A fibrous ceramic material in accordance with claim 1, wherein said fibrous ceramic material is formed from precursor ceramic material.

30. A fibrous ceramic material in accordance with claim 29, wherein said precursor ceramic material comprises at least one of ceria, zirconia and alumina.

\* \* \* \* \*